G. HOLTZ.
METHOD OF PRODUCING BACKINGS FOR ARTIFICIAL TEETH.
APPLICATION FILED MAR. 25, 1916.
Reissued May 9, 1916.
14,128.
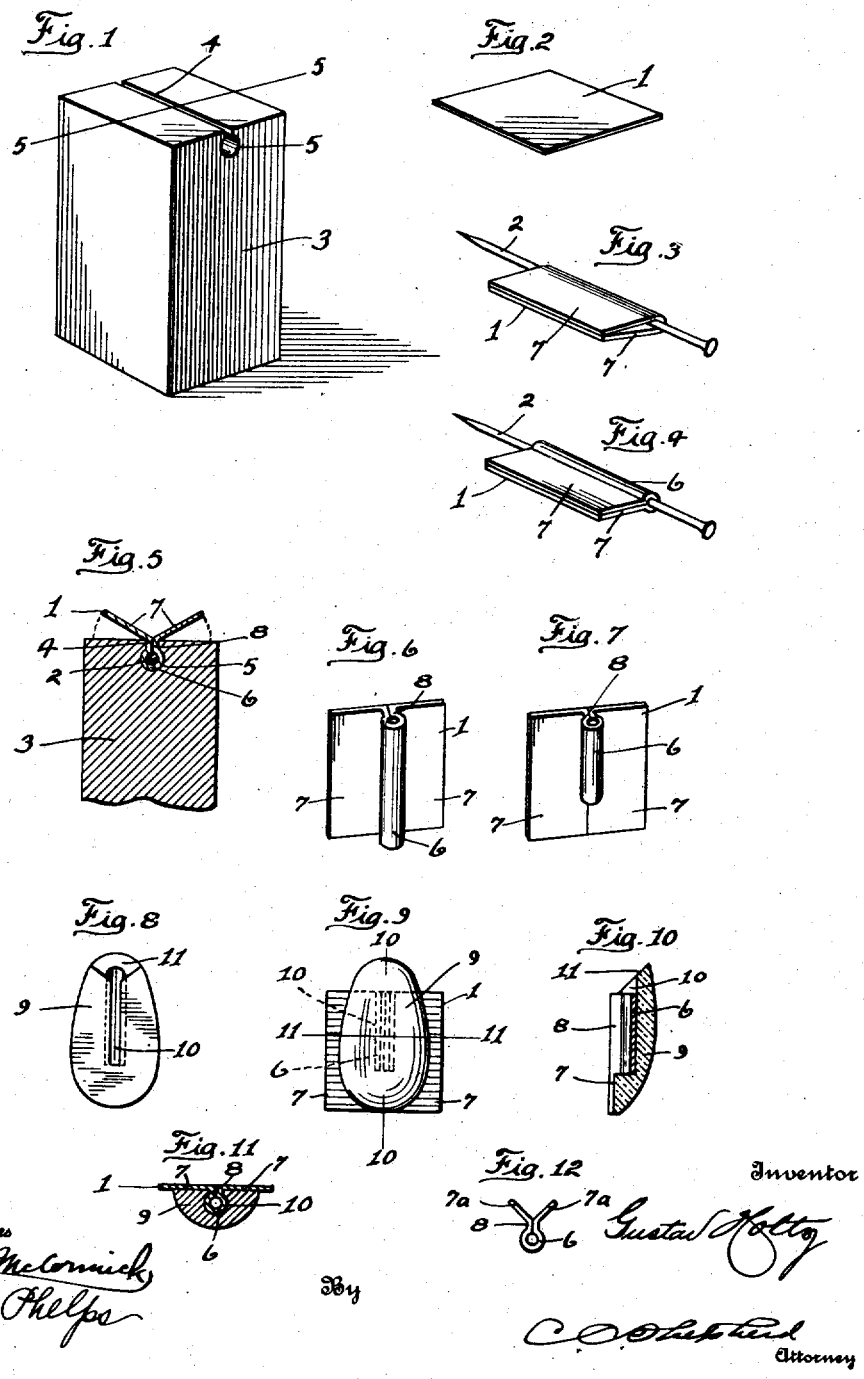
Witnesses
R. M. McCormick
A. L. Phelps
Inventor
Gustav Holtz
By
C. O. Lockwood
Attorney
THE COLUMBIA PLANOGRAPH CO., WASHINGTON, D. C.

UNITED STATES PATENT OFFICE.

GUSTAV HOLTZ, OF GOULDSBORO, PENNSYLVANIA, ASSIGNOR TO THE COLUMBUS DENTAL MANUFACTURING COMPANY, OF COLUMBUS, OHIO, A CORPORATION OF OHIO.

METHOD OF PRODUCING BACKINGS FOR ARTIFICIAL TEETH.

14,128. Specification of Reissued Letters Patent. Reissued May 9, 1916.

Original No. 1,070,132, dated August 12, 1913, Serial No. 721,651. Application for reissue filed March 25, 1916. Serial No. 86,767.

*To all whom it may concern:*

Be it known that I, GUSTAV HOLTZ, a citizen of the United States, residing at Gouldsboro, in the county of Wayne and State of Pennsylvania, have invented a new and useful Method of Producing Backings for Artificial Teeth, of which the following is a specification.

This invention has reference to improvements in producing backings for use on artificial teeth, and may be employed both for regulation and casting purposes.

The object of the present invention is the production of backings in a manner which will enable any dentist to produce his own backings at a cost far below the price charged by manufacturers for backings and at practically the cost of material alone.

The invention will be best understood from a consideration of the following detailed description taken in connection with the accompanying drawings, forming a part of this specification, with the further understanding that while the drawings show means for the practical realization of the invention, it is susceptible of accomplishment through other means, wherefore the invention is not confined to any strict conformity with the showing of the drawings, for the means whereby the invention may be practised can be changed and modified, so long as such changes and modifications mark no material departure from the salient features of the invention.

In the drawings:—Figure 1 is a perspective view of a die used in the practice of the invention, Fig. 2 is a perspective view of a blank from which a backing may be formed, Fig. 3 is a perspective view illustrating the first step in the formation of a backing from a blank, Fig. 4 is a perspective view illustrating a further step, Fig. 5 is a section of the die on the line 5—5 of Fig. 1, with the backing in the process of formation therein and also shown in section, Fig. 6 is a perspective view of a backing after its removal from the die, Fig. 7 is a perspective view of the backing completed, ready for fitting to a tooth facing, Fig. 8 is a rear elevation of a tooth facing, to which the backing is to be secured, Fig. 9 is a front elevation of a tooth facing with the backing applied and ready for trimming. Fig. 10 is a section on the line 10—10 of Fig. 9, Fig. 11 is a section on the line 11—11 of Fig. 9, and, Fig. 12 is an end view of a backing prepared for casting purposes.

Referring to the drawings, there is shown in Fig. 2 a blank 1, which may be made of any suitable metal, this blank being cut to suitable size so that after proper treatment it will be sufficiently extensive to cover the reverse or back of a Steele facing, although so far as the present invention is concerned it may have a greater extent of use than with Steele facings.

The blank 1 may be cut from a sheet of metal of suitable gage, and it is then bent upon itself at an intermediate point about a mandrel 2. Since the facings are of standard form with respect to the part to which the backing is applied, the mandrel should also be of proper size with relation to the gage of the metal sheet or blank 1. Ordinarily the sheet 1 will be of No. 32 B. & S. gage, although it may under some circumstances, be as thick as No. 30 and as thin as No. 36. The mandrel 2 may conveniently be a BB pin or a 1/64 inch wire. The size of the mandrel, however, will vary with the gage of the blank, being of smaller diameter for the thicker gage and larger diameter for the thinner gage, but the BB pin or wire of the size mentioned answers for 32 gage plate.

The blank is sufficiently thin to be conveniently bent about the mandrel by the fingers of the operator. The bending of the blank upon itself midway of its length in one direction produces what is shown in Fig. 3, and the two halves of the blank, which by the fingers of the operator have been brought into edge contact, are now brought into face contact from the mandrel outwardly by means of any suitable tool, such as flat nose pliers, producing the form illustrated in Fig. 4. The pin or mandrel 2 may now be withdrawn or it may remain in place and in such case the ends should be cut off.

There is also provided a block or die 3, shown in Figs. 1 and 5, which block is for convenience of manipulation, somewhat elongated in one direction, and at one end the block is provided with a longitudinal slot 4, and a longitudinal passage 5 into which the slot opens. The passage 5 is of a diameter to receive that portion of the blank folded about the mandrel and which may be described as an elongated eye or offset tubular rib 6, while the width of the slot 4 is sufficient to snugly receive the wings or flange portions of the folded blank projecting from the eye or rib, which parts are individually designated by the reference numeral 7. The slot 4 with the passage 5 constitutes in effect an undercut slot extending through the die and opening through one face thereof, with which slot the eye or rib is adapted to interlock.

The flanges or wings 7 are first spread apart by the fingers after the folded blank has been introduced into passage 5 of the die with the wings 7 projecting through the slot 4, and then by means of a small mallet these wings are forced down upon the face of the die on opposite sides of the slot 4 until they extend in opposite directions one with relation to the other. The finished backing comprises the elongated eye or rib 6, the oppositely extended wings 7—7, and a short web 8 between the eye or rib 6 and the wings 7—7 corresponding to the depth of the slot 4. The wings are shown in the partially flattened position in Fig. 5, and in the fully flattened position in Fig. 6. For reasons which will hereafter appear, the eye 6 and the corresponding web 8 are cut away for about one-third of their length so that the wings 7 in the direction of the fold of the blank are about one-third longer than the eye 6 and web 8, which latter extend from one end of the blank toward the other for about two-thirds of the length of the blank in the direction of the fold. The completed backing ready for use is shown in Fig. 7.

In Figs. 8 to 11, a Steele facing 9 is indicated, and this facing which is made to resemble a human tooth, has a flat rear face in which is produced an undercut longitudinal slot 10 closed near one end of the facing and open near the other, which facing is at the open end of the slot appropriately beveled as shown at 11. The backing may now be applied to the facing with the eye or rib 6 entering the slot 10 until that end of the eye which had been shortened by removing a portion of its length abuts against the closed end of the slot, while those portions of the wings 7—7 extending beyond the eye 6 reach to that end of the facing which constitutes the active end thereof when in the mouth of the user. The backing may now be trimmed into conformity with the outline of the facing, after which the facing may be removed from the backing and the latter may be soldered to the foundation of the bridge work, and the end openings of the eye 6 and the joints in the web 8 and junction points of the wings 7 are also soldered. The mandrel or pin 2 need not be removed, but may simply be cut off so as to act as a filler for the eye 6 and the solder will then seal any parts which might otherwise be exposed. When the bridge work with the backings soldered thereto is completed, the facing or facings have a suitable cement applied thereto and are then in turn applied to the appropriate backings, and upon the setting of the cement are firmly united in place, being strongly held against any dislodging forces, by the anchor action of the eye and web connection with the flanges 7, which in turn are firmly soldered to the bridge foundation.

The backing so far described is particularly adapted to what is known as regulation bridge work. For casting purposes, the flanges 7 are not bent to a single plane as in Fig. 7, but are bent into angular relation, one with the other, of about ninety degrees so that they have an angular relation to the web 8 of about forty-five degrees. These flanges may be cut off to a length of about one-eighth of an inch from the web, or the original blank 1 may be of a suitable size so that the anchoring flanges indicated at $7^a$ in Fig. 12 will be initially formed without the necessity of the removal of any of the metal.

By this method of forming backing plates, the dentist is enabled to manufacture these plates with no other implements or material than a suitable supply of sheet metal of appropriate kind, a die 3 and a supply of pins 2, the latter of which may be bought in the open market, although if preferred a supply of wire of appropriate size may be provided instead of the pins, but the latter have the advantage of extreme cheapness and uniform size. The die is important in that it provides a means for the accurate formation of the backing with the central eye or anchor adapted to the undercut groove 10 of the facing 9.

In actual practice the dentist is enabled by making the backings himself to save fully sixty per cent. of the cost of backings now obtainable on the market, so that the cost of the backings is substantially that of the material employed, while the original cost of the die is small and the time consumed in the formation of the backings is practically negligible, since a large supply of these backings may be made in but a few minutes.

What I claim, is:

1. The method of producing metal backings for artificial teeth with a die, which consists in providing a sheet metal blank of appropriate gage, folding said blank intermediately about a mandrel of appropriate diameter, forming the fold into an elongated anchor and providing a wing on each side of the anchor, mounting the folded blank upon a die with the anchor interlocked therewith, and then spreading out the wings of the blank projecting from the die.

2. The method of producing metal backings for artificial teeth with a die, which consists in providing a metal blank of sheet form of appropriate size and gage, bending the blank intermediately upon itself about a mandrel of appropriate size, forcing the portions of the blank projecting from the mandrel into face contact to produce an elongated anchor embracing the mandrel, then placing the anchor portion of the folded blank in the die, and then bending apart the folded portion of the blank at a distance from the anchor while held in the die to form a web connecting the anchor portion of the blank with the bent-apart or wing portions.

3. The method of producing metal backings for bridge work with a die, which consists in providing a metal blank of sheet form of appropriate size and gage, bending the blank intermediately upon itself about a mandrel of appropriate size, forcing the portions of the blank projecting from the mandrel into face contact to produce an elongated anchor in embracing relation to the mandrel, then placing the anchor portion of the folded blank into a slot of the die, and then bending apart the folded portions of the blank at a distance from the anchor while held in the die to form a web connecting the anchor portion of the blank with the bent-apart portions, then hammering down upon the die the said bent-apart portions until they are brought into one plane at substantially right angles to the web connecting them with the anchor.

4. The method of producing backings for dental bridge work with a die, consisting in providing a blank in sheet form, bending said blank intermediately upon itself about a mandrel with that portion embracing the mandrel formed into an elongated anchor, introducing the anchor portion of the folded blank into a slot of the die, then spreading apart those portions of the folded blank projecting from the anchor while in the die at a distance from said anchor to produce a web immediately adjacent to said anchor and a wing on each side thereof, then hammering down upon the die the wings until they are in one plane at substantially right angles to the web, then removing the blank from the die, and then cutting off a portion of the anchor and web, whereby the backing in its finished form has the anchor of less length than the backing in the direction of the length of the intermediate fold.

5. The method of producing backings for dental bridge work, which consists in providing a die with an undercut slot therethrough opening through one face thereof, then providing a sheet metal blank of appropriate size and gage, then folding said blank intermediately about a mandrel of appropriate diameter for forcing the portions of the blank projecting from the mandrel into face contact to produce an elongated anchor, then placing the anchor portion of the blank into the slot of the die leaving the rest of the blank projecting therefrom, then bending apart the folded portion of the blank at a distance from the anchor while held in the die so as to form a pair of wings and a web connecting the wings and anchor, then hammering down the wings flat upon the face of the die on each side of the slot, and finally removing the blank from the die.

GUSTAV HOLTZ.

In presence of—
Geo. L. Marshall,
Otto Ulbrich.

Copies of this patent may be obtained for five cents each, by addressing the "Commissioner of Patents, Washington, D. C."